United States Patent
Jiang et al.

(10) Patent No.: US 9,674,065 B2
(45) Date of Patent: Jun. 6, 2017

(54) METHOD, APPARATUS AND SYSTEM FOR DETECTING NETWORK ELEMENT LOAD IMBALANCE

(71) Applicant: ZTE Corporation, Shenzhen, Guangdong (CN)

(72) Inventors: Chunhe Jiang, Shenzhen (CN); Feng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 122 days.

(21) Appl. No.: 14/437,337

(22) PCT Filed: Sep. 27, 2013

(86) PCT No.: PCT/CN2013/084512
§ 371 (c)(1),
(2) Date: Apr. 21, 2015

(87) PCT Pub. No.: WO2014/063557
PCT Pub. Date: May 1, 2014

(65) Prior Publication Data
US 2015/0271045 A1    Sep. 24, 2015

(30) Foreign Application Priority Data

Oct. 22, 2012   (CN) .......................... 2012 1 0404787

(51) Int. Cl.
*G01R 31/08* (2006.01)
*H04L 12/26* (2006.01)
(Continued)

(52) U.S. Cl.
CPC ........ *H04L 43/0888* (2013.01); *H04L 41/069* (2013.01); *H04L 41/0681* (2013.01);
(Continued)

(58) Field of Classification Search
CPC ................................ H04L 12/28; H04L 12/56
(Continued)

(56) References Cited

U.S. PATENT DOCUMENTS

2004/0248592 A1   12/2004   Turina
2006/0092940 A1*   5/2006   Ansari ................... H04L 45/00
                                                    370/392
(Continued)

FOREIGN PATENT DOCUMENTS

CN            1971532 A      5/2007
CN          101136805 A      3/2008
(Continued)

OTHER PUBLICATIONS

Supplementary European Search Report in European application No. 13849007.3, mailed on Sep. 23, 2015.
(Continued)

*Primary Examiner* — Iqbal Zaidi
(74) *Attorney, Agent, or Firm* — Oppedahl Patent Law Firm LLC

(57) ABSTRACT

Disclosed are a method, apparatus and system for detecting network element (NE) load imbalance, the method comprising the following steps: according to a preset detection policy, performing differentiation analysis for the NE performance index reported by every NE device, and storing the analysis results to the network index buffer pool; obtaining periodically the differentiation analysis results from the network index buffer pool, and determining whether there is a load imbalance anomaly among NE devices; when an anomaly is found, sending an alarm message. By using the techniques of load average value differentiation computing, load differentiation percent computing and threshold comparison, the present invention can detect in a timely manner load imbalance problems among NE devices in scenarios in which multiple NE devices are managed together, thereby enabling, by sending alarm message at once, users to be notified to eliminate possible hidden safety risks, and thus (Continued)

improving the reliability, maintainability and stability of network communication devices.

12 Claims, 3 Drawing Sheets

(51) Int. Cl.
H04L 12/24 (2006.01)
H04L 12/801 (2013.01)
H04L 29/08 (2006.01)

(52) U.S. Cl.
CPC .......... *H04L 43/0817* (2013.01); *H04L 43/16* (2013.01); *H04L 47/11* (2013.01); *H04L 67/10* (2013.01); *H04L 41/0803* (2013.01); *H04L 67/1034* (2013.01)

(58) Field of Classification Search
USPC .......... 370/252–396; 709/202–234, 252–396
See application file for complete search history.

(56) References Cited

U.S. PATENT DOCUMENTS

| | | |
|---|---|---|
| 2006/0258348 A1 | 11/2006 | Rajala |
| 2011/0320586 A1 | 12/2011 | Maltz |
| 2012/0204176 A1 | 8/2012 | Tian |
| 2013/0223367 A1* | 8/2013 | Wang ............... H04W 74/00 370/329 |
| 2014/0105218 A1* | 4/2014 | Anand ............ H04L 47/6255 370/412 |

FOREIGN PATENT DOCUMENTS

| | | |
|---|---|---|
| CN | 101384054 A | 3/2009 |
| CN | 101458634 A | 6/2009 |
| CN | 101945407 A | 1/2011 |
| CN | 102232282 A | 11/2011 |
| CN | 102611564 A | 7/2012 |
| CN | 102932170 A | 2/2013 |
| WO | 03019958 A1 | 3/2003 |

OTHER PUBLICATIONS

International Search Report in international application No. PCT/CN2013/084512, mailed on Jan. 2, 2014.
English Translation of the Written Opinion of the International Search Authority in international application No. PCT/CN2013/084512, mailed on Jan. 2, 2014.

* cited by examiner

US 9,674,065 B2

METHOD, APPARATUS AND SYSTEM FOR DETECTING NETWORK ELEMENT LOAD IMBALANCE

TECHNICAL FIELD

The disclosure relates to the field of network management, and in particular to a method, apparatus, and system for detecting network element (NE) load imbalance.

BACKGROUND

In the field of network communication, as an amount of communicated information increases, there is an increasing user demand for communication products of high stability and high performance. This puts a higher requirement on reliability of a communication device.

At present, a NE management system (centralized network management) that can manage multiple NEs at the same time enjoys increasing popularity among operators. A user may see an operating status and a health indicator of a NE in real time via a NE management system. Thus, network operating and maintaining personnel may maintain a NE with a problem in time, such that reliability of a network device may be improved.

As shown in FIG. 1, with existing NE management system architecture, various processing units and NE proxy units may be deployed in a NE, and a NE manager unit and a warning unit may be deployed in a NE management system. After a network service occurs, a processing unit will report data corresponding to the service to a NE proxy unit. The NE proxy unit may generate an important network performance indicator according to data reported by a processing unit and save the network performance indicator in a NE indicator buffer pool. When appropriate (at regular intervals), the NE proxy unit will report an indicator in the NE indicator buffer pool to the NE manager unit. The NE manager unit may process a received NE indicator and save the processed NE indicator to a NE M indicator buffer pool or a NE N indicator buffer pool. The NE manager unit may regularly detect whether there is an abnormality (such as an overload) in a NE indicator in the NE M indicator buffer pool and the NE N indicator buffer pool. When there is such an abnormality, the NE manager unit may report in time the abnormality information to the warning unit such that a user may be warned by a warning device such as a sound and/or light alarm or the like, for example, which prompts the user to deal with the abnormality as soon as possible.

Under normal circumstances, such a mode may meet a most basic demand for NE operation maintenance by operating and maintaining personnel. With this mode however, detection aims only at a single NE, and a warning is not given unless there is a real problem with a NE. The mode is clearly insufficient to meet a user requirement of increasing concern for device automation, multi-NE correlation analysis, and failure prevention. In actual network operation, most problems may occur not because all NEs are overloaded, but because of accumulating inter-NE load imbalance. NE load imbalance may be discovered via inter-NE indicator gap analysis and may be prevented in time at an initial stage of a problem.

It may be affirmed that manual indicator gap analysis by operating and maintaining personnel is clearly inefficient, by which a problem may not be discovered in real time. With increasing complication and diversification of NEs managed by a NE management system, there are more and more important inter-NE indicators and an increasingly complicated inter-NE relation, such that an aforementioned problem becomes more prominent. Therefore, a NE management system is facing a severe test in terms of ensuring reliability, availability, maintainability, and stability of a NE.

SUMMARY

An embodiment herein provides a method, apparatus, and system for detecting NE load imbalance, allowing a NE management system to discover a security risk in a NE in time via automatic NE indicator gap analysis.

To this end, a technical solution according to an embodiment herein may be implemented as follows.

A method for detecting network element (NE) load imbalance includes:

performing gap analysis, according to a preset detecting strategy, on a NE performance indicator reported by a NE, and saving a result of the gap analysis in a network indicator buffer pool; and regularly acquiring, from the network indicator buffer pool, the result of the gap analysis, and determining, according to the acquired result of the gap analysis, whether there is an inter-NE load imbalance; issuing a warning when it is determined that there is such an inter-NE load imbalance.

The detecting strategy may include a load percentage threshold strategy, a constraining absolute value threshold strategy, and a load proportion strategy.

The warning may include current indicator information, threshold information, and load proportion information.

The performing gap analysis, according to a preset detecting strategy, on a NE performance indicator reported by a NE may include:

determining, according to indicator information in a NE performance indicator buffer pool, whether a NE performance indicator set for any NE managed by a NE management system is complete;

when the NE performance indicator set is complete, determining whether the NE performance indicator of each NE has exceeded a preset constraining absolute value threshold;

when the NE performance indicator of each NE has exceeded a preset constraining absolute value threshold, computing, according to a load proportion and a NE performance indicator of a NE, an average load deviation, wherein the average load deviation P, as a benchmark for determining whether a NE performance indicator indicates overload of a NE, is computed according to $P = \Sigma C_i / \Sigma D_i$, with $C_i$ being a current NE performance indicator, $D_i$ being a load proportion of a NE;

computing, according to the average load deviation and a NE performance indicator of a NE, a load deviation percentage of the NE according to $V_x = (C_x/D_x - P) \ast 100/P$, with $V_x$ being the load deviation percentage of a NE, $C_x$ being the current NE performance indicator, $D_x$ being the load proportion of the NE, P being the average load deviation;

comparing the load deviation percentage of a NE with a preset load percentage threshold; when the load deviation percentage of the NE exceeds the load percentage threshold, indicating a performance abnormality of the NE; when the load deviation percentage of the NE does not exceed the load percentage threshold, indicating a normal performance state of the NE.

The load percentage threshold may contain a positive load percentage threshold and a negative load percentage threshold, a positive $V_x$ may be compared with the positive load percentage threshold, and a negative Vx may be compared with the negative load percentage threshold.

The issuing a warning when it is determined that there is such an inter-NE load imbalance may include:

detecting whether a warning has been issued and whether the issued warning has been canceled; when a warning has been issued and has not been canceled, issuing no more NE overload warning; otherwise when no warning currently exists, issuing a new NE overload warning. The NE overload warning may include the current indicator information, the threshold information, and the load proportion information.

An apparatus for detecting network element (NE) load imbalance includes: a strategy configuring unit; a NE performance indicator buffer pool; a load imbalance detecting unit; and a network indicator buffer pool.

The strategy configuring unit is configured for configuring a parameter of a detecting strategy for performing gap analysis on a NE performance indicator of a NE.

The NE performance indicator buffer pool is configured for storing a NE performance indicator reported by a NE.

The load imbalance detecting unit is configured for performing gap analysis, according to a preset detecting strategy, on a NE performance indicator reported by a NE, and saving a result of the gap analysis in a network indicator buffer pool.

The network indicator buffer pool is configured for storing the result of the gap analysis.

The detecting strategy may include a load percentage threshold strategy, a constraining absolute value threshold strategy, and a load proportion strategy.

A system for detecting network element (NE) load imbalance includes:

a NE configured for reporting a local NE performance indicator;

an apparatus for detecting NE load imbalance configured for performing gap analysis, according to a preset detecting strategy, on a NE performance indicator reported by a NE, and saving a result of the gap analysis in a network indicator buffer pool; and a NE management system configured for regularly acquiring, from the network indicator buffer pool of the apparatus for detecting NE load imbalance, the result of the gap analysis, and determining, according to the acquired result of the gap analysis, whether there is an inter-NE load imbalance; issuing a warning when it is determined that there is such an inter-NE load imbalance.

The detecting strategy may include a load percentage threshold strategy, a constraining absolute value threshold strategy, and a load proportion strategy.

The warning may include current indicator information, threshold information, and load proportion information.

The apparatus for detecting NE load imbalance may be configured for: determining, according to indicator information in a NE performance indicator buffer pool, whether a NE performance indicator set for any NE managed by the NE management system is complete;

when the NE performance indicator set is complete, determining whether the NE performance indicator of each NE has exceeded a preset constraining absolute value threshold;

when the NE performance indicator of each NE has exceeded a preset constraining absolute value threshold, computing, according to a load proportion and a NE performance indicator of a NE, an average load deviation, wherein the average load deviation P, as a benchmark for determining whether a NE performance indicator indicates overload of a NE, is computed according to $P = \Sigma C_i / \Sigma D_i$, with $C_i$ being a current NE performance indicator, $D_i$ being a load proportion of a NE;

computing, according to the average load deviation and a NE performance indicator of a NE, a load deviation percentage of the NE according to $V_x = (C_x / D_x 31 P) \cdot 100 / P$, with $V_x$ being the load deviation percentage of a NE, $C_x$ being the current NE performance indicator, $D_x$ being the load proportion of the NE, P being the average load deviation; and comparing the load deviation percentage of a NE with a preset load percentage threshold; when the load deviation percentage of the NE exceeds the load percentage threshold, indicating a performance abnormality of the NE; when the load deviation percentage of the NE does not exceed the load percentage threshold, indicating a normal performance state of the NE.

The load percentage threshold may contain a positive load percentage threshold and a negative load percentage threshold, a positive Vx may be compared with the positive load percentage threshold, and a negative Vx may be compared with the negative load percentage threshold.

The NE management system may be configured for detecting whether a warning has been issued and whether the issued warning has been canceled; when a warning has been issued and has not been canceled, issuing no more NE overload warning; otherwise when no warning currently exists, issuing a new NE overload warning. The NE overload warning may include the current indicator information, the threshold information, and the load proportion information.

It may be seen that with a technical solution according to an embodiment herein, by computing an average load deviation and a load deviation percentage and comparison with a threshold, NE load imbalance may be discovered in time in a scene of multiple management-sharing different-type NEs; thereby a user may be informed by a warning as soon as possible to eliminate in time a possible security risk at a NE; moreover, a hidden trouble may be eliminated automatically through modification using a preset automatic load strategy to improve reliability, maintainability, and stability of a network communication device.

DETAILED DESCRIPTION

A technical solution herein is further elaborated below with reference to the drawings and embodiments.

Figure 1:
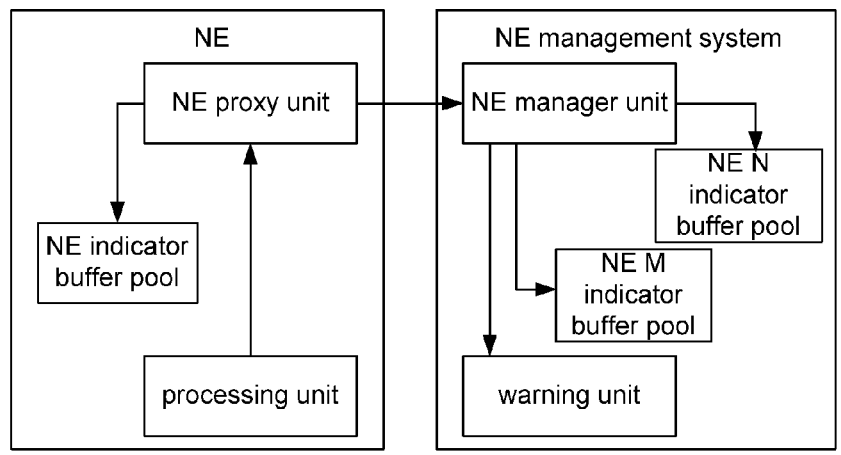
FIG. 1 is a schematic diagram of existing architecture for processing a NE overload.
Figure 2:
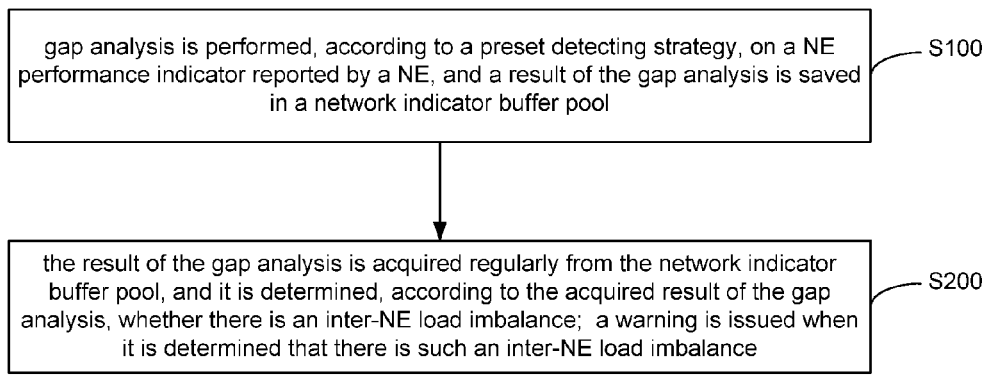
FIG. 2 is a flowchart of a method for detecting NE load imbalance according to an embodiment herein.

As shown in FIG. 2, a method for detecting NE load imbalance according to an embodiment herein may include steps as follows.

In S100, gap analysis is performed, according to a preset detecting strategy, on a NE performance indicator reported by a NE, and a result of the gap analysis is saved in a network indicator buffer pool.

In S200, the result of the gap analysis is acquired regularly from the network indicator buffer pool, and it is determined, according to the acquired result of the gap analysis, whether there is an inter-NE load imbalance; a warning is issued when it is determined that there is such an inter-NE load imbalance.

In the step S100, the detecting strategy may include a load percentage threshold strategy, a constraining absolute value threshold strategy, and a load proportion strategy.

In the step S200, the warning may include current indicator information, threshold information, and load proportion information.

The NE performance indicator may involve two application scenes as follows.

One scene involves load balance detection among same-type NEs, such as load balance detection among MSCs in a Mobile Switching Center (MSC) pool or load balance detection among SGSNs in a Serving GPRS support Node (SGSN) POOL. An indicator under detection may be a service-related indicator, such as (for the SGSN POOL) a number of attached users, an average number of activated sessions, a Gn/Gp port traffic, or the like.

Figure 3:
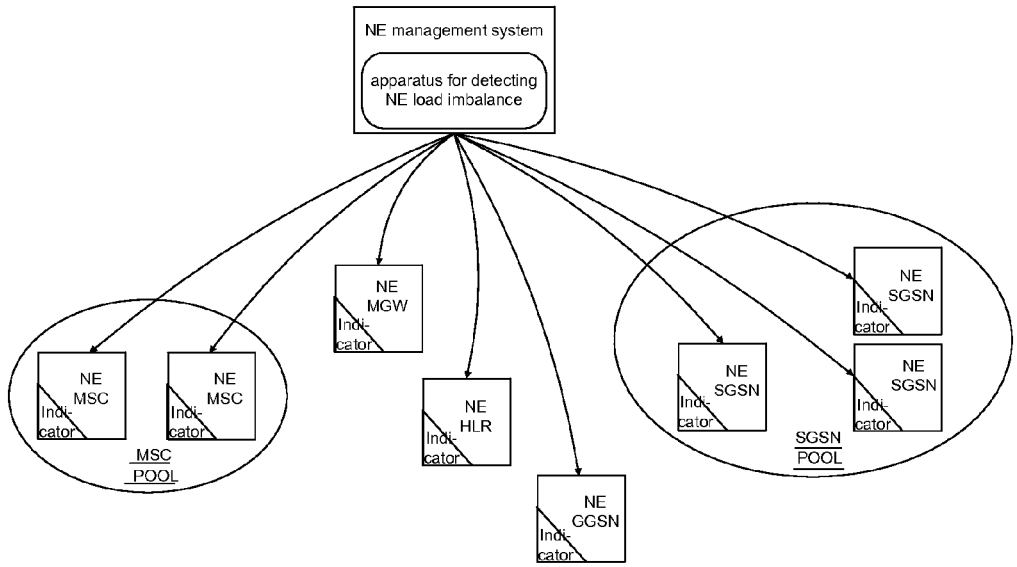
FIG. 3 is a schematic diagram of networking for detecting NE load imbalance according to an embodiment herein.

The other scene involves load balance detection among different-type NEs, such as detecting load balance between an SGSN and a Gateway GPRS Support Node (GGSN). An indicator under detection in general may be a hardware-related common indicator, such as CPU occupancy, memory occupancy, network traffic, or the like, or may be a service indicator for logic correlation, such as a correlation indicator between a number of SGSN attached users and a GGSN born number, or the like. A schematic diagram of networking for detecting NE load imbalance herein may be as shown in FIG. 3. A NE may provide an indicator value corresponding to the NE. An apparatus for detecting NE load imbalance may be deployed as a separate device, or as an independent apparatus in a NE management system, and may perform load balance detection on some NEs of user concern.

In the step S100, gap analysis may be performed, according to the preset detecting strategy, on a NE performance indicator reported by a NE in steps including those as follows.

In step A, it is determined, according to indicator information in a NE performance indicator buffer pool, whether a NE performance indicator set for any NE managed by a NE management system is complete, when the NE performance indicator set is complete, the flow goes to step B, otherwise the flow goes to step C.

In step B, it is determined whether the NE performance indicator of each NE has exceeded a preset constraining absolute value threshold; when the NE performance indicator of each NE has exceeded a preset constraining absolute value threshold, the flow goes to step D, otherwise the flow goes to step C.

In step C, the indicator gap analysis is ended.

In step D, an average load deviation is computed according to a load proportion and a NE performance indicator of a NE; the average load deviation P, as a benchmark for determining whether a NE performance indicator indicates overload of a NE, is computed according to $P = \Sigma C_i / \Sigma D_i$, with $C_i$ being a current NE performance indicator, $D_i$ being a load proportion of a NE.

In step E, a load deviation percentage of the NE is computed according to the average load deviation and a NE performance indicator of a NE according to $V_x = (C_x/D_x - P)*100/P$, with $V_x$ being the load deviation percentage of a NE, $C_x$ being the current NE performance indicator, $D_x$ being the load proportion of the NE, P being the NE average load deviation.

In step F, the load deviation percentage of a NE is compared with a preset load percentage threshold; when the load deviation percentage of the NE exceeds the load percentage threshold, the flow goes to step G, otherwise the flow goes to step H.

In step G, a performance abnormality of the NE is indicated.

In step H, a normal performance state of the NE is indicated.

in the step F, the load percentage threshold may contain a positive load percentage threshold and a negative load percentage threshold; a positive $V_x$ may be compared with the positive load percentage threshold; a negative $V_x$ may be compared with the negative load percentage threshold.

In the step S200, when it is determined that there is such an inter-NE load imbalance, a warning may be issued in steps including those as follows.

In step a, it is detected whether a warning has been issued and whether the issued warning has been canceled; when a warning has been issued and has not been canceled, the flow goes to step b, otherwise the flow goes to step c.

In step b, no more NE overload warning is issued.

In step c, a new NE overload warning is issued. The new NE overload warning may carry the current indicator information, the threshold information, and the load proportion information.

The method may further include that: when a normal performance state is determined, it is detected whether a warning has been issued and whether the issued warning has been canceled. When a warning has been issued and has not been canceled, the NE overload warning is canceled, otherwise no processing is performed.

A method for detecting NE load imbalance according to an embodiment herein, implemented by an apparatus for detecting NE load imbalance, mainly may include steps as follows.

In step 1, gap analysis is performed, according to a set detecting strategy, on a NE performance indicator reported by a NE, and a result of the gap analysis is saved in a network indicator buffer pool. The detecting strategy may include a load percentage threshold, a constraining absolute value threshold, and a load proportion.

A detecting strategy set in an embodiment herein may include three parts as follows.

The first part may be a load percentage threshold, which may include a positive load percentage threshold and a negative load percentage threshold. In addition, a positive load percentage threshold and a negative load percentage threshold each may be configured with multiple level thresholds each representing a load imbalance indicator threshold for a level of load imbalance warning.

The second part may be a constraining absolute value threshold representing an indicator baseline for performing load imbalance detection. With a small amount of data to be processed, a large NE load gap may be acceptable.

The third part may be a load proportion representing a processing capacity of a NE. Depending on different software/hardware configurations, NEs may have different processing capacities. A proportion/ratio thereof may not necessarily be 1:1.

In step 2, the result of the gap analysis of the NEs in the network indicator buffer pool may be sent to a NE manager unit of a NE management system. The NE manager unit may discover an abnormality in the result, and issue the warning to a warning unit. The warning information may include the current indicator information, the threshold information, and a load proportion.

In an embodiment herein, the warning information may include three parts as follows.

The first part may be the current indicator information, such that operating and maintaining personnel may learn in real time a current NE load.

The second part may be the current threshold information, such that operating and maintaining personnel may learn a threshold configuration when the warning is issued. The threshold configuration may be modified, so the warning may have to be issued matching a current threshold.

The third part may be the load proportion information, such that operating and maintaining personnel may learn load proportion information when the warning is issued. The load proportion information may be adjusted as well.

Figure 4:
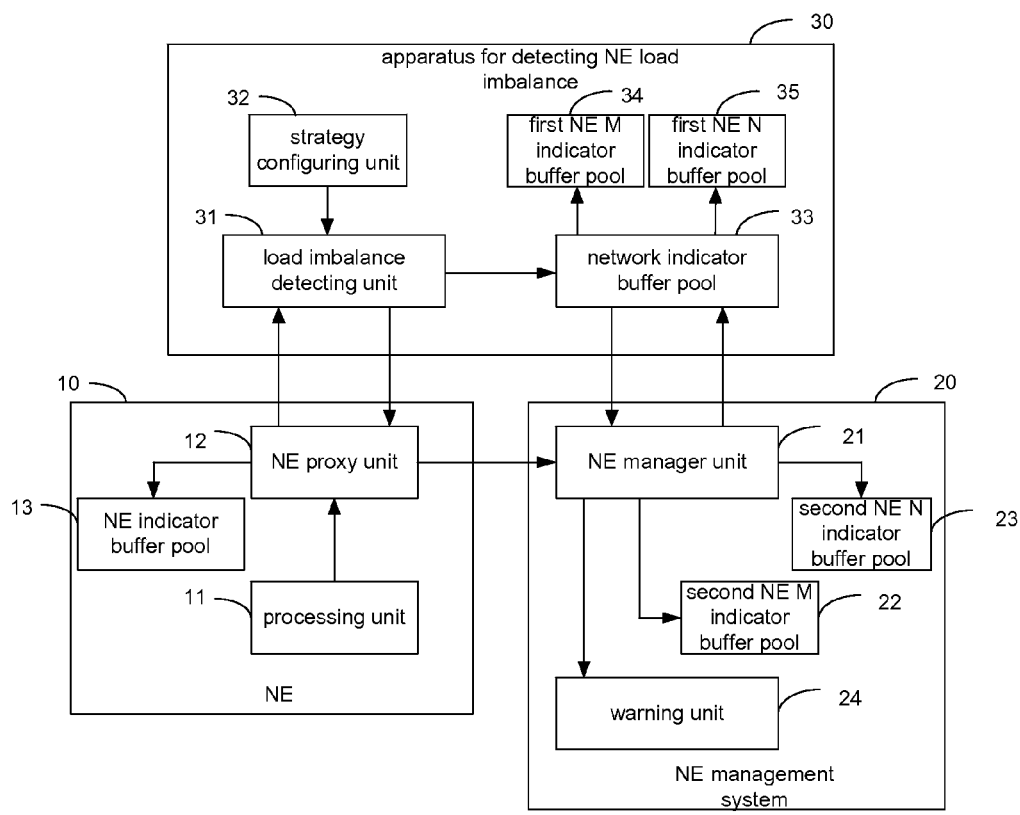
FIG. 4 is a schematic diagram of a structure of a system for detecting NE load imbalance according to an embodiment herein.

According to an embodiment herein, an apparatus for detecting NE load imbalance, as shown in FIG. 4, may include: a strategy configuring unit; a NE performance indicator buffer pool; a load imbalance detecting unit; and a network indicator buffer pool.

The strategy configuring unit 32 may be configured for configuring a parameter of a detecting strategy for performing gap analysis on a NE performance indicator of a NE.

The NE performance indicator buffer pool may be configured for storing a NE performance indicator reported by a NE.

The load imbalance detecting unit 31 may be configured for performing gap analysis, according to a preset detecting strategy, on a NE performance indicator reported by a NE, and saving a result of the gap analysis in a network indicator buffer pool.

The network indicator buffer pool 33 may be configured for storing the result of the gap analysis.

For example, in the embodiment, the NE performance indicator buffer pool may include a first NE M indicator buffer pool 34 and a first NE N indicator buffer pool 35.

The first NE M indicator buffer pool 34 may be configured for storing the performance indicator of a NE M, as part of NE performance indicators on which gap analysis is to be performed.

The first NE N indicator buffer pool 35 may be configured for storing the performance indicator of a NE N, as part of NE performance indicators on which gap analysis is to be performed.

The detecting strategy may include a load percentage threshold strategy, a constraining absolute value threshold strategy, and a load proportion strategy.

In an actual application, the load imbalance detecting unit 31, the strategy configuring unit 32, the network indicator buffer pool 33, the first NE M indicator buffer pool 34, and the first NE N indicator buffer pool 35 may be implemented by a Central Processing Unit (CPU), a Digital Signal Processor (DSP), or a Field-Programmable Gate Array (FPGA).

As shown in FIG. 4, according to an embodiment herein, a system for detecting NE load imbalance may include:

a NE 10 configured for reporting a local NE performance indicator;

an apparatus for detecting NE load imbalance 30 configured for performing gap analysis, according to a preset detecting strategy, on a NE performance indicator reported by a NE, and saving a result of the gap analysis in a network indicator buffer pool; and a NE management system 20 configured for regularly acquiring, from the network indicator buffer pool of the apparatus for detecting NE load imbalance 30, the result of the gap analysis, and determining, according to the acquired result of the gap analysis, whether there is an inter-NE load imbalance; issuing a warning when it is determined that there is such an inter-NE load imbalance.

The detecting strategy may include a load percentage threshold strategy, a constraining absolute value threshold strategy, and a load proportion strategy.

The warning may include current indicator information, threshold information, and load proportion information.

The apparatus for detecting NE load imbalance 30 may be configured for determining, according to indicator information in a NE performance indicator buffer pool, whether a NE performance indicator set for any NE managed by the NE management system is complete;

when the NE performance indicator set is complete, determining whether the NE performance indicator of each NE has exceeded a preset constraining absolute value threshold;

when the NE performance indicator of each NE has exceeded a preset constraining absolute value threshold, computing, according to a load proportion and a NE performance indicator of a NE, an average load deviation, wherein the average load deviation P, as a benchmark for determining whether a NE performance indicator indicates overload of a NE, is computed according to $P = \Sigma C_i / \Sigma D_i$, with $C_i$ being a current NE performance indicator, $D_i$ being a load proportion of a NE;

computing, according to the average load deviation and a NE performance indicator of a NE, a load deviation percentage of the NE according to $V_x = (C_x/D_x - P) * 100 / P$, with $V_x$ being the load deviation percentage of a NE, $C_x$ being the current NE performance indicator, $D_x$ being the load proportion of the NE, P being the average load deviation;

comparing the load deviation percentage of a NE with a preset load percentage threshold;

when the load deviation percentage of the NE exceeds the load percentage threshold, indicating a performance abnormality of the NE, otherwise indicating a normal performance state of the NE.

The load percentage threshold contains a positive load percentage threshold and a negative load percentage threshold, a positive $V_x$ is compared with the positive load percentage threshold, and a negative $V_x$ is compared with the negative load percentage threshold.

The NE management system 20 may be configured for detecting whether a warning has been issued and whether the issued warning has been canceled; when a warning has been issued and has not been canceled, issuing no more NE overload warning; otherwise when no warning currently exists, issuing a new NE overload warning. The new NE overload warning may carry the current indicator information, the threshold information, and the load proportion information.

In the embodiment, as shown in FIG. 4, in the apparatus for detecting NE load imbalance 30 (for implementing the method for detecting NE load imbalance shown in FIG. 2), the load imbalance detecting unit 31 and the strategy configuring unit 32 are connected to each other; the load imbalance detecting unit 31 and the network indicator buffer pool 33 are connected to each other; the network indicator buffer pool 33, the first NE M indicator buffer pool 34, and the first NE N indicator buffer pool 35 are connected to each other.

The load imbalance detecting unit 31 may be configured for performing gap analysis, according to a configured detecting strategy, on a NE performance indicator reported by a NE, and saving a result of the gap analysis in a network indicator buffer pool 33.

The strategy configuring unit 32 may be configured for configuring and storing a parameter of a detecting strategy for load imbalance detection.

The network indicator buffer pool 33 may be configured for saving the result of NE load balance detection obtained by gap analysis, and sending the result of the gap analysis to the NE management system 20.

The first NE M indicator buffer pool 34 may be configured for saving the result of load gap analysis for the NE M.

the first NE N indicator buffer pool 35 may be configured for saving the result of load gap analysis for the NE N.

In the NE 10, the processing unit 11, the NE proxy unit 12, and the NE indicator buffer pool 13 may be connected to the load imbalance detecting unit 31.

The processing unit 11 may be configured for detecting a NE operating status; when a service occurs on a network, reporting, to the NE proxy unit 12, data corresponding to the service.

The NE proxy 12 may be connected to the processing unit 11 and the load imbalance detecting unit 31, and may be configured for receiving data reported by the processing unit 11 and extracting a NE performance indicator from the received data, and then caching the extracted indicator in the NE indicator buffer pool 13 of the NE, and when appropriate (at regular intervals), reporting the NE performance indicator of the NE to the load imbalance detecting unit 31 for performance indicator gap analysis. The original NE performance indicator of the NE will also be reported to the NE management system 20 for single NE indicator analysis.

The NE indicator buffer pool 13 may be connected to the NE proxy unit 12, and may be configured for NE performance indicator caching.

The NE management system 20 may be connected to the network indicator buffer pool 33 and may include: a NE manager unit 21, a second NE M indicator buffer pool 22, a second NE N indicator buffer pool 23, and a warning unit 24.

The NE manager unit 21 may be connected to the NE proxy 12 and the network indicator buffer pool 33, and be configured for receiving the NE performance indicator of a single NE sent by the NE proxy 12, caching the received indicator in the second NE M indicator buffer pool and the second NE N indicator buffer pool, analyzing the cached indicator; acquiring and analyzing the result of the NE gap analysis in the network indicator buffer pool 33; issuing a warning to the warning unit 24 when an abnormality is discovered.

The second NE M indicator buffer pool 22 may be connected to the NE manager unit 21, and be configured for caching the NE indicator of the NE M.

The second NE N indicator buffer pool 23 may be connected to the NE manager unit 21, and be configured for caching the NE indicator of the NE N.

The warning unit 24 may be connected to the NE manager unit 21, and be configured for displaying the warning sent by the NE manager unit 21 and implementing a warning such as by sound and/or light.

In an actual application, the NE manager unit 21, the second NE M indicator buffer pool 22, the second NE N indicator buffer pool 23, and the warning unit 24 may be implemented by a CPU, a DSP, or an FPGA.

Figure 5:
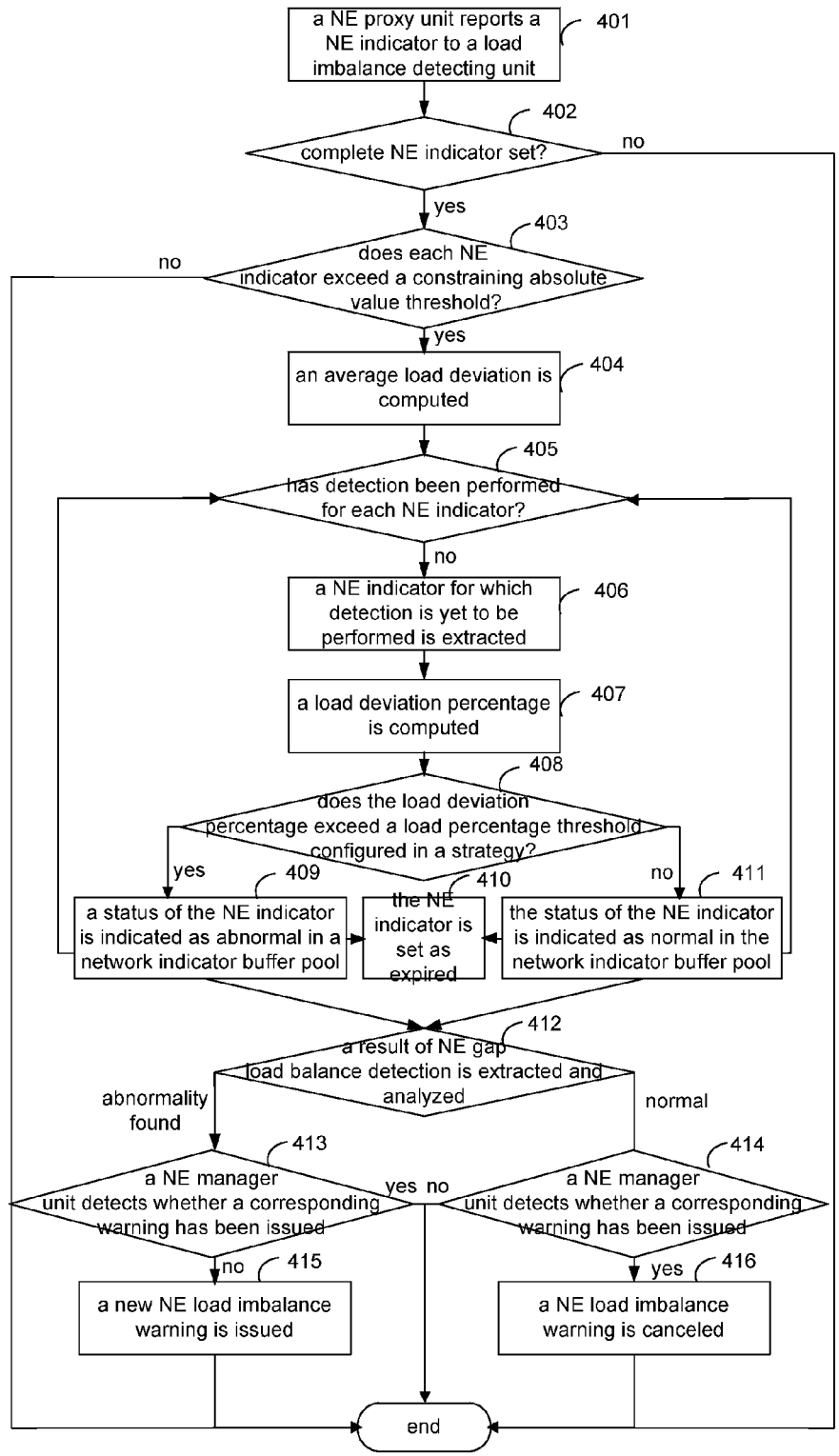
FIG. 5 is a flowchart of a method for detecting NE load imbalance according to an embodiment herein.

The method for detecting NE load imbalance according to an embodiment herein may be elaborated below with reference to the apparatus for detecting NE load balance shown in FIG. 4. As shown in FIG. 5, which is a flowchart of a method for detecting NE load imbalance according to an embodiment herein, the method mainly may include steps as follows.

A detection flow thereof may include steps as follows.

In step 401, a NE proxy unit 12 reports a NE performance indicator of a local NE to a load imbalance detecting unit 31. The indicator must contain a valid performance indicator value.

In step 402, the load imbalance detecting unit 31 detects, according to a strategy, whether a reported NE indicator set is complete, that is, whether each strategy monitored NE has reported its performance indicator; if so, the flow goes to step 403; otherwise, the flow ends.

In step 403, the load imbalance detecting unit 31 detects, according to a strategy, whether a reported NE indicator exceeds the constraining absolute value threshold according to a strategy; if so, the flow goes to step 404; otherwise, the flow ends.

In step 404, the load imbalance detecting unit 31 computes, according to a NE indicator value and a strategy-configured NE load proportion, an average load deviation $P=\Sigma Ci/\Sigma Di$. The Ci may be the current value of a NE indicator under detection. The Di may be the load proportion of a NE.

In step 405, the load imbalance detecting unit 31 checks whether detection has been performed for each NE indicator; if so, the flow ends; otherwise, the flow goes to step 406.

In step 406, the load imbalance detecting unit 31 extracts a NE indicator for which detection is yet to be performed.

In step 407, the load imbalance detecting unit 31 computes a load deviation percentage $V=(C/D-P)*100/P$. The C may be the current detecting indicator of the NE. The D may be the load proportion of the NE. The P may be the average load deviation.

In step 408, the load imbalance detecting unit 31 detects whether the load deviation percentage of the NE exceeds a load percentage threshold configured in a strategy; if so, the flow goes to step 409; otherwise, the flow goes to step 411.

In step 409, the load imbalance detecting unit 31 indicates the NE indicator of the NE as abnormal in a network indicator buffer pool 33; the flow returns to step 405.

In step 410, the load imbalance detecting unit 31 sets the NE indicator in the network indicator buffer pool 33 as expired.

In step 411, the load imbalance detecting unit 31 indicates the NE indicator of the NE as normal in the network indicator buffer pool 33; the flow returns to step 405.

A processing flow in the method may include steps as follows.

In step 412, a NE manager unit 21 extracts, from the network indicator buffer pool 33, the result of the NE gap analysis, and analyzes the same; the flow goes to step 413 when an abnormality is discovered; otherwise, the flow goes to step 414.

In step 413, the NE manager unit 21 extracts a NE indicator from the network indicator buffer pool 33, detects whether a corresponding warning has been issued and whether the issued warning has been canceled; when the issued warning exists, the flow ends; otherwise, the flow goes to step 415.

In step 414, the NE manager unit 21 extracts, from the network indicator buffer pool 33, the NE indicator, detecting whether a corresponding warning has been issued and whether the issued warning has been canceled; if so, the flow goes to step 416; otherwise, flow ends.

In step 415, the NE manager unit 21 issues a new NE load imbalance warning to the warning unit 24. The warning may carry current indicator information, threshold information, and load proportion information.

In step 416, the NE manager unit 21 issues a warning removing message to the warning unit 24 to cancel the NE load imbalance warning.

Note that another similar problem may be solved with an embodiment herein. For example, load imbalance detection may be performed on similar indicators in a NE to automatically uncover whether there is a logic unit load imbalance within the NE.

The disclosure may include further embodiments. For example, the load imbalance detecting unit may be connected, not to the NE proxy unit, but directly to the NE manager unit. In general, those skilled in the art may make various modifications and variations according to the disclosure without departing from the spirit and essence of the disclosure. Such modifications and variations each should fall within the scope of the disclosure.

What described are merely embodiments of the disclosure, and are not intended to limit the scope of the disclosure. All equivalent structures or flow variations made using content of the specification and accompanying drawings of the disclosure, or direct or indirect application in another related technical field, likewise fall within the scope of the disclosure.

The invention claimed is:

1. A method for detecting network element (NE) load imbalance, comprising:
performing gap analysis, according to a preset detecting strategy, on a NE performance indicator reported by a NE, and saving a result of the gap analysis in a network indicator buffer pool;
regularly acquiring, from the network indicator buffer pool, the result of the gap analysis, and determining, according to the acquired result of the gap analysis, whether an inter-NE load imbalance exists; issuing a warning when determining that the inter-NE load imbalance exists,
wherein the performing gap analysis, according to a preset detecting strategy, on a NE performance indicator reported by a NE comprises:
determining, according to indicator information in a NE performance indicator buffer pool, whether a NE performance indicator set for any NE managed by a NE management system is complete;
when the NE performance indicator set is complete, determining whether the NE performance indicator of each NE has exceeded a preset constraining absolute value threshold;
when the NE performance indicator of each NE has exceeded a preset constraining absolute value threshold, computing, according to a load proportion and a NE performance indicator of a NE, an average load deviation, wherein the average load deviation P, as a benchmark for determining whether a NE performance indicator indicates overload of a NE, is computed according to
$P = \Sigma C_i / \Sigma D_i$, with $C_i$ being a current NE performance indicator, $D_i$ being a load proportion of a NE;
computing, according to the average load deviation and a NE performance indicator of a NE, a load deviation percentage of the NE according to
$V_x = (C_x/D_x - P)*100/P$, with $V_x$ being the load deviation percentage of a NE, $C_x$ being the current NE performance indicator, $D_x$ being the load proportion of the NE, P being the average load deviation;
comparing the load deviation percentage of a NE with a preset load percentage threshold; when the load deviation percentage of the NE exceeds the load percentage threshold, indicating a performance abnormality of the NE; when the load deviation percentage of the NE does not exceed the load percentage threshold, indicating a normal performance state of the NE.

2. The method according to claim 1, wherein the detecting strategy comprises a load percentage threshold strategy, a constraining absolute value threshold strategy, and a load proportion strategy.

3. The method according to claim 1, wherein the warning comprises current indicator information, threshold information, and load proportion information.

4. The method according to claim 1, wherein the load percentage threshold contains a positive load percentage threshold and a negative load percentage threshold, a positive $V_x$ is compared with the positive load percentage threshold, and a negative $V_x$ is compared with the negative load percentage threshold.

5. The method according to claim 1, wherein the issuing a warning when determining that the inter-NE load imbalance exists comprises:
detecting whether a warning has been issued and whether the issued warning has been canceled; when a warning has been issued and has not been canceled, issuing no more NE overload warning; otherwise when no warning currently exists, issuing a new NE overload warning.

6. An apparatus for detecting network element (NE) load imbalance, comprising:
at least one hardware processor:
a non-transitory computer-readable medium storing computer readable instructions executable by the at least one hardware processor;
a NE performance indicator buffer pool configured for storing a NE performance indicator reported by a NE; and
a network indicator buffer pool,
wherein
the at least one hardware processor is configured for:
configuring a parameter of a detecting strategy for performing gap analysis on the NE performance indicator of the NE;
performing gap analysis, according to a preset detecting strategy, on the NE performance indicator reported by the NE, and saving a result of the gap analysis in the network indicator buffer pool;
wherein the network indicator buffer pool is configured for storing the result of the gap analysis,
wherein the at least one hardware processor is configured for performing the gap analysis, according to the preset detecting strategy, on the NE performance indicator reported by the NE by:
determining, according to indicator information in the NE performance indicator buffer pool, whether a NE performance indicator set for any NE managed by a NE management system is complete;
when the NE performance indicator set is complete, determining whether the NE performance indicator of each NE has exceeded a preset constraining absolute value threshold;
when the NE performance indicator of each NE has exceeded a preset constraining absolute value threshold, computing, according to a load proportion and a NE performance indicator of a NE, an average load deviation, wherein the average load deviation P, as a benchmark for determining whether a NE performance indicator indicates overload of a NE, is computed according to $P=\Sigma C_i/\Sigma D_i$, with $C_i$ being a current NE performance indicator, $D_i$ being a load proportion of a NE;

computing, according to the average load deviation and a NE performance indicator of a NE, a load deviation percentage of the NE according to $V_x=(C_x/D_x-P)*100/P$, with $V_x$ being the load deviation percentage of a NE, $C_x$ being the current NE performance indicator, $D_x$ being the load proportion of the NE, P being the average load deviation;

comparing the load deviation percentage of a NE with a preset load percentage threshold; when the load deviation percentage of the NE exceeds the load percentage threshold, indicating a performance abnormality of the NE; when the load deviation percentage of the NE does not exceed the load percentage threshold, indicating a normal performance state of the NE.

7. The apparatus according to claim 6, wherein the detecting strategy comprises a load percentage threshold strategy, a constraining absolute value threshold strategy, and a load proportion strategy.

8. A system for detecting network element (NE) load imbalance, comprising: a NE, an apparatus for detecting NE load imbalance, and a NE management system, each comprising at least one hardware processor and a non-transitory computer-readable medium storing computer readable instructions executable by the at least one hardware processor, wherein the at least one hardware processor of the NE is configured for reporting a NE performance indicator of the NE;

wherein the at least one hardware processor of the apparatus for detecting NE load imbalance is configured for performing gap analysis, according to a preset detecting strategy, on the NE performance indicator reported by the NE, and saving a result of the gap analysis in a network indicator buffer pool;

wherein the at least one hardware processor of the NE management system is configured for: regularly acquiring, from the network indicator buffer pool of the apparatus for detecting NE load imbalance, the result of the gap analysis, and determining, according to the acquired result of the gap analysis, whether an inter-NE load imbalance exists; issuing a warning when determining that the inter-NE load imbalance exists, wherein the at least one hardware processor of the apparatus for detecting NE load imbalance is configured for:

determining, according to indicator information in a NE performance indicator buffer pool, whether a NE performance indicator set for any NE managed by the NE management system is complete;

when the NE performance indicator set is complete, determining whether the NE performance indicator of each NE has exceeded a preset constraining absolute value threshold;

when the NE performance indicator of each NE has exceeded a preset constraining absolute value threshold, computing, according to a load proportion and a NE performance indicator of a NE, an average load deviation, wherein the average load deviation P, as a benchmark for determining whether a NE performance indicator indicates overload of a NE, is computed according to $P=\Sigma C_i/\Sigma D_i$, with $C_i$ being a current NE performance indicator, $D_i$ being a load proportion of a NE;

computing, according to the average load deviation and a NE performance indicator of a NE, a load deviation percentage of the NE according to $V_x=(C_x/D_x-P)*100/P$, with $V_x$ being the load deviation percentage of a NE, $C_x$ being the current NE performance indicator, $D_x$ being the load proportion of the NE, P being the average load deviation;

comparing the load deviation percentage of a NE with a preset load percentage threshold; when the load deviation percentage of the NE exceeds the load percentage threshold, indicating a performance abnormality of the NE; when the load deviation percentage of the NE does not exceed the load percentage threshold, indicating a normal performance state of the NE.

9. The system according to claim 8, wherein the detecting strategy comprises a load percentage threshold strategy, a constraining absolute value threshold strategy, and a load proportion strategy.

10. The system according to claim 8, wherein the warning comprises current indicator information, threshold information, and load proportion information.

11. The system according to claim 8, wherein the load percentage threshold contains a positive load percentage threshold and a negative load percentage threshold, a positive $V_x$ is compared with the positive load percentage threshold, and a negative $V_x$ is compared with the negative load percentage threshold.

12. The system according to claim 8, wherein the at least one hardware processor of the NE management system is configured for detecting whether a warning has been issued and whether the issued warning has been canceled; when a warning has been issued and has not been canceled, issuing no more NE overload warning; otherwise when no warning currently exists, issuing a new NE overload warning.

* * * * *